United States Patent
Kondareddy et al.

(10) Patent No.: US 11,595,972 B2
(45) Date of Patent: Feb. 28, 2023

(54) DEVICES, SYSTEMS AND METHODS FOR POWER OPTIMIZATION USING TRANSMISSION SLOT AVAILABILITY MASK

(71) Applicant: Cypress Semiconductor Corporation, San Jose, CA (US)

(72) Inventors: Raghunatha Kondareddy, Fremont, CA (US); Kamesh Medapalli, San Jose, CA (US)

(73) Assignee: Cypress Semiconductor Corporation, San Jose, CA (US)

( * ) Notice: Subject to any disclaimer, the term of this patent is extended or adjusted under 35 U.S.C. 154(b) by 0 days.

(21) Appl. No.: 16/577,888

(22) Filed: Sep. 20, 2019

(65) Prior Publication Data
US 2020/0229215 A1    Jul. 16, 2020

Related U.S. Application Data

(60) Provisional application No. 62/793,279, filed on Jan. 16, 2019.

(51) Int. Cl.
| | |
|---|---|
| *H04W 72/12* | (2009.01) |
| *H04W 72/04* | (2009.01) |
| *H04W 4/80* | (2018.01) |
| *H04W 72/1263* | (2023.01) |
| *H04W 72/0446* | (2023.01) |

(52) U.S. Cl.
CPC ......... *H04W 72/1215* (2013.01); *H04W 4/80* (2018.02); *H04W 72/0446* (2013.01); *H04W 72/1263* (2013.01)

(58) Field of Classification Search
CPC .................. H04W 72/0446–1263; H04W 4/80
See application file for complete search history.

(56) References Cited

U.S. PATENT DOCUMENTS

| | | | | |
|---|---|---|---|---|
| 8,155,612 | B1* | 4/2012 | Husted | H04B 1/406 |
| | | | | 455/84 |
| 2004/0242159 | A1* | 12/2004 | Calderon | H04W 16/14 |
| | | | | 455/63.3 |
| 2007/0177542 | A1* | 8/2007 | Hirsch | H04W 16/14 |
| | | | | 370/329 |
| 2008/0123610 | A1* | 5/2008 | Desai | H04W 28/02 |
| | | | | 370/339 |

(Continued)

OTHER PUBLICATIONS

Bluetooth Core Specification v 5.0, Dec. 6, 2016, Bluetooth SIG, pp. 1-4, 264, 478-484, 554-558, 1477-1478 (Year: 2016).*

(Continued)

*Primary Examiner* — Gennadiy Tsvey

(57) ABSTRACT

A method can include at a combination device, receiving or generating a slot availability mask (SAM) information compatible with a Bluetooth and/or Bluetooth Low Energy (BT) standard; by operation of BT compatible circuits of the combination device, determining a schedule of BT compatible data transfers in response to at least the SAM information; and by operation of circuits compatible with at least one IEEE 802.11 wireless standard (WLAN circuits), determining a schedule of WLAN compatible data transfers in response to at least the SAM information. Related systems and methods are also disclosed.

20 Claims, 12 Drawing Sheets

(56) References Cited

U.S. PATENT DOCUMENTS

| | | | | |
|---|---|---|---|---|
| 2008/0130603 A1* | 6/2008 | Wentink | ............ | H04W 52/0206 455/41.2 |
| 2008/0139118 A1* | 6/2008 | Sanguinetti | .......... | H04B 1/0053 455/41.2 |
| 2008/0300025 A1* | 12/2008 | Song | .................. | H04M 1/6066 455/569.1 |
| 2009/0238249 A1* | 9/2009 | van Waasen | .......... | H04W 88/06 375/260 |
| 2009/0239471 A1* | 9/2009 | Tran | ....................... | H04B 1/406 455/41.2 |
| 2009/0285167 A1* | 11/2009 | Hirsch | .............. | H04W 72/1215 370/329 |
| 2012/0182976 A1* | 7/2012 | Thoukydides | .... | H04W 72/1215 370/336 |
| 2013/0170478 A1* | 7/2013 | Xhafa | ............... | H04W 72/0446 370/336 |
| 2015/0111610 A1* | 4/2015 | Hwang | ............. | H04W 72/1215 455/553.1 |
| 2015/0148031 A1* | 5/2015 | He | ....................... | H04W 84/12 455/432.1 |
| 2015/0256473 A1* | 9/2015 | Walker | .................. | H04L 67/142 370/253 |
| 2016/0105902 A1* | 4/2016 | Hirsch | ................... | H04B 7/024 370/329 |
| 2016/0286607 A1* | 9/2016 | Mishra | ................ | G08B 25/009 |
| 2017/0347373 A1* | 11/2017 | Vig | ........................ | H04W 4/80 |
| 2018/0091929 A1* | 3/2018 | Bi | ........................... | H04W 4/80 |
| 2018/0116003 A1* | 4/2018 | Gu | ........................ | H04W 4/70 |
| 2018/0248811 A1* | 8/2018 | Di Nallo | ................ | H04B 7/061 |
| 2018/0324618 A1* | 11/2018 | Chay | ................ | H04W 72/1215 |
| 2018/0352558 A1* | 12/2018 | Paycher | ............ | H04W 72/1205 |

OTHER PUBLICATIONS

International Search Report for international application No. PCT/US2019/060591 dated Jan. 2, 2020, 2 pages.

Written Opinion of the International Searching Authority for international application No. PCT/US2019/060591 dated Jan. 2, 2020, 7 pages.

\* cited by examiner

FIG. 6A — 620

| BT Slot | M | S | M | S | M | S | M | S | M | S | M | S | M | S | M | S | M | S | M | S | M | S |
|---|---|---|---|---|---|---|---|---|---|---|---|---|---|---|---|---|---|---|---|---|---|---|
| Can TX | Y | Y | Y | Y | N | N | N | N | N | N | N | N | N | N | N | N | N | N | N | Y | Y | Y |
| Can RX | Y | Y | Y | Y | N | N | N | N | N | N | N | N | N | N | N | N | N | N | N | Y | Y | Y |
| Combo Device | BT | | | | WLAN TXOP/RXOP | | | | | | | | | | | | | BT | | BT | | |

ANCHOR (left), ANCHOR (right)

| | Submap1 | Submap2 | Submap3 | Submap4 | Submap5 | Submap6 |
|---|---|---|---|---|---|---|
| BT Submap Type | 1 | 2 | 2 | 2 | 2 | 1 |
| Combo Device | BT | WLAN TXOP/RXOP | | | | BT |

ANCHOR (left), ANCHOR (right)

618-0' | 622' | 618-1'

DEVICES, SYSTEMS AND METHODS FOR POWER OPTIMIZATION USING TRANSMISSION SLOT AVAILABILITY MASK

RELATED APPLICATIONS

This application claims the benefit of U.S. provisional patent application having Ser. No. 62/793,279, filed on Jan. 16, 2019, the contents of which are incorporated by reference herein.

TECHNICAL FIELD

The present disclosure relates generally to wireless networks, and more particularly to wireless networks that include combination devices able to execute data transfers according to two or more different wireless communication protocols.

BACKGROUND

Providing different wireless communication circuits on the same integrated circuit device can provide cost-effective, compact and power efficient solutions to devices requiring wireless communication capabilities. For example, integrated circuits can include Bluetooth compatible circuits collocated with circuits compatible with one or more IEEE 802.11 standards (WLAN circuits).

A challenge presented by BT-WLAN combination devices is that the communication circuits can share the same medium (frequencies around 2.4 GHz). To ensure that BT transmissions do not interfere with WLAN transmissions (and vice versa), a combination device can include a medium control mechanism. For example, in some conventional BT-WLAN combination devices, BT circuits can request control of the medium. If WLAN circuits are not currently transmitting or receiving, control of the medium can be passed to the BT circuits for predetermined amount of time. Control can then return to the WLAN circuits.

Any way of decreasing power consumption could benefit power sensitive applications, such as portable devices having the need for dual wireless capabilities. Further, increasing WLAN performance (e.g., WLAN link capacity) in a combination device could provide a competitive advantage over conventional devices.

BRIEF DESCRIPTION OF THE DRAWINGS

FIGS. 6A and 6B are diagrams of SAMs according to embodiments.

DETAILED DESCRIPTION

Figure 1A:
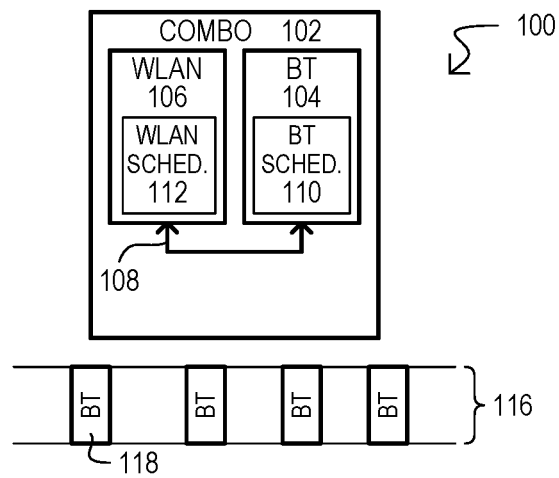
FIGS. 1A to 1C are diagrams showing a system and operations according to an embodiment.

According to embodiments system can include a combination device where a first wireless circuit can operate according to a schedule (e.g., slot availability map, SAM) compatible with a first standard (e.g., Bluetooth or Bluetooth Low Energy, BT). Information from the schedule can be sent to collocated second circuits to alter transmissions compatible with a second standard (e.g., an IEEE 802.11 wireless standard, WLAN).

In some embodiments, based on SAM information from BT circuits, collocated WLAN circuits can aggregate transmissions into time periods of no scheduled BT activity.

In some embodiments, based on SAM information from BT circuits, collocated WLAN circuits can send transmissions indicating time periods of no scheduled BT activity as preferred WLAN reception windows.

In some embodiments, BT circuits can send pre-trigger signals to collocated WLAN circuits prior to the start of time periods of no scheduled BT activity. The WLAN circuits can then execute WLAN data transfers in such time periods.

In some embodiments, BT circuits collocated with WLAN circuits can be configured to serve as a sink for streaming data. The BT circuits can receive or negotiate a SAM with a data source having a low receive data duty cycle.

In the various embodiments below, like items are referred to by the same reference characters, but with the leading digit(s) corresponding to the figure number.

Figure 1B:
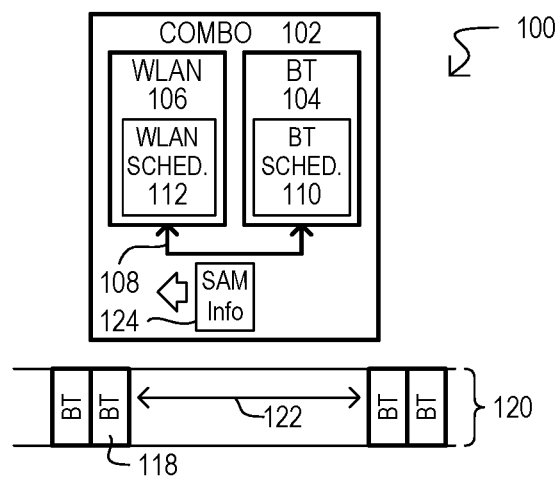
Figure 1C:
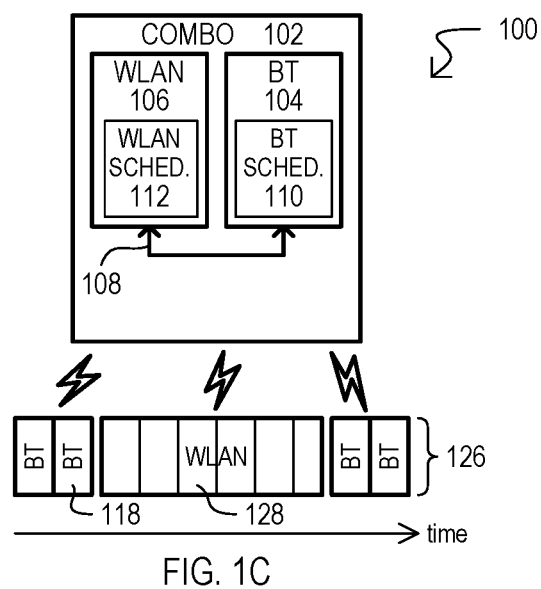

FIGS. 1A to 1C are a sequence of diagrams showing operations of a system 100 with a combination device 102 according to embodiments. FIGS. 1A to 1C show a combination device 102 that includes first wireless circuits 104 in communication with second wireless circuits 106 over communication path 108. First and second wireless circuits 104/106 can transmit and receive data wirelessly according to different standards/protocols. In the embodiment shown, first wireless circuits 104 can be compatible with a Bluetooth or Bluetooth Low Energy (herein referred to as BT)

standard and second wireless circuits 106 can be compatible with one or more IEEE 802.11 wireless standards (herein referred to as WLAN). First and second wireless circuits 104/106 can be formed in a same integrated circuit (IC) device, and in some embodiments can be formed in a same IC substrate.

First wireless circuits 104 can include first scheduling circuit 110 which can receive, create, and/or negotiate a schedule for transmissions according to the first standard. In some embodiments, a schedule can take the form of a BT Slot Availability Mask (SAM). Second wireless circuits 106 can include second scheduling circuit 112 which can execute data transfers according to the second standard. Further, unlike conventional approaches, second wireless circuits 106 can alter data transfers based on schedule information received from first wireless circuits 104.

FIG. 1A shows a system 100 in an initial state. First wireless circuits 104 can schedule operations according to a default manner, specifying the availability or unavailability of transmission time periods (e.g., BT slots). For example, scheduling can be established by a controller of first wireless circuits 104 based on an application executed by combination device 102. Consequently, first wireless circuits 104 can present a conventional schedule 116 that shows used slots (one shown 118). Used slots can be those in which first wireless circuits 104 will transmit data or expect to receive data. Second wireless circuits 106 can also operate in a conventional fashion, transmitting and receiving according to its own second scheduling circuits 112.

In FIG. 1A, first and second wireless circuits (104 and 106) can be controlling access to a wireless medium in a conventional fashion. For example, first wireless circuits 104 can request control of the medium from second wireless circuits 106 when it seeks to transmit and/or receive data. When second wireless circuits receive such a request they can yield the medium to the requesting wireless circuits for a predetermined amount of time or can refuse to yield the medium forcing the first wireless circuits 104 to request the medium again.

FIG. 1B shows a system 100 adopting a modified schedule according to an embodiment. As a result of the modified schedule, used slots can be concentrated in time to create one or more groups of consecutive unused slots. FIG. 1B shows one example of a modified schedule 120. Used slots (e.g., 118) have been concentrated resulting in a time period 122 formed by unused slots. A modified schedule 120 can be created by first wireless circuits 104 receiving and accepting a schedule from another device, or by first scheduling circuit 110 creating its own schedule by maximizing consecutive unused slots while still meeting scheduled transmission requirements.

While time period 122 can be considered to include unused slots with respect to first wireless circuits 104, such a time period may be considered to include used slots by other devices operating according to the first standard. That is, a modified schedule (e.g., 120) sent by combination device 102 can indicate time period 122 as including used slots, thereby preventing or reducing transmissions by other first standard devices during the time period 122.

As noted above, while a first scheduling circuit 110 can generate a modified schedule (e.g., 120), a modified schedule can also be received from, or negotiated with, one or more other devices (not shown). Embodiments can include a modified schedule 120 being received by another device operating according to the first standard. The modified schedule 120 can be accepted by combination device 102 returning a message to the other device. A modified schedule 120 can also be negotiated with another device operating according to the first standard. As but one example, first scheduling circuits 110 can generate a first schedule and transmit it to the other device. If the other device does not accept the schedule, the schedule can be further modified and sent for adoption by the other device. Such an operation can include the combination device 102 receiving a schedule from the other device, and modifying its schedule based on the received schedule.

Referring still to FIG. 1B, once a modified schedule has been established, first scheduling circuits 110 can send schedule information 124 over communication path 108 to second scheduling circuits 112. Based on such schedule information 124, second scheduling circuits 112 can modify its data transfer operations. As but one example, second scheduling circuits 112 can arrange for transmissions to be concentrated in a time period 122. Schedule information can take any suitable form, including but not limited to: a data structure reflecting the modified schedule and/or trigger signals related to the timing of the schedule. In some embodiments, trigger signals can be issued prior to the start of a time period 122. Trigger signals can also be issued prior to the start of the next used slot (e.g., 118) following a time period 122, or prior to the end of the time period 122.

FIG. 1C shows system 100 operations during the time period corresponding to a modified schedule (e.g., 120). Actual transmissions 126 can include transmissions according to the first standard occurring the scheduled time slots (one shown as 118). In addition, transmissions according to the second standard (one shown as 128) have been concentrated in time period 122.

Figure 2A:
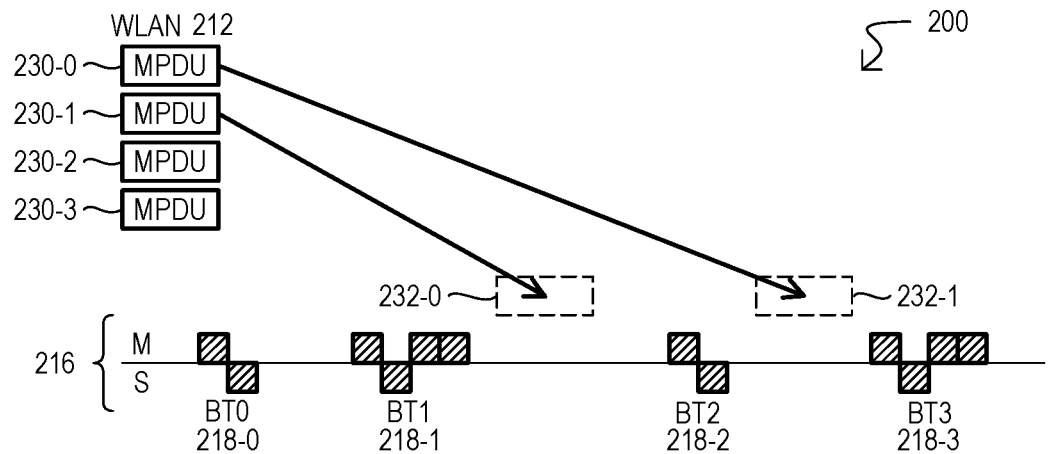
FIGS. 2A and 2B are diagrams showing consolidation of IEEE 802.11 wireless compatible (WLAN) transmissions in windows created by a slot allocation map (SAM) of collocated Bluetooth compatible (BT) circuits according to an embodiment.
Figure 2B:
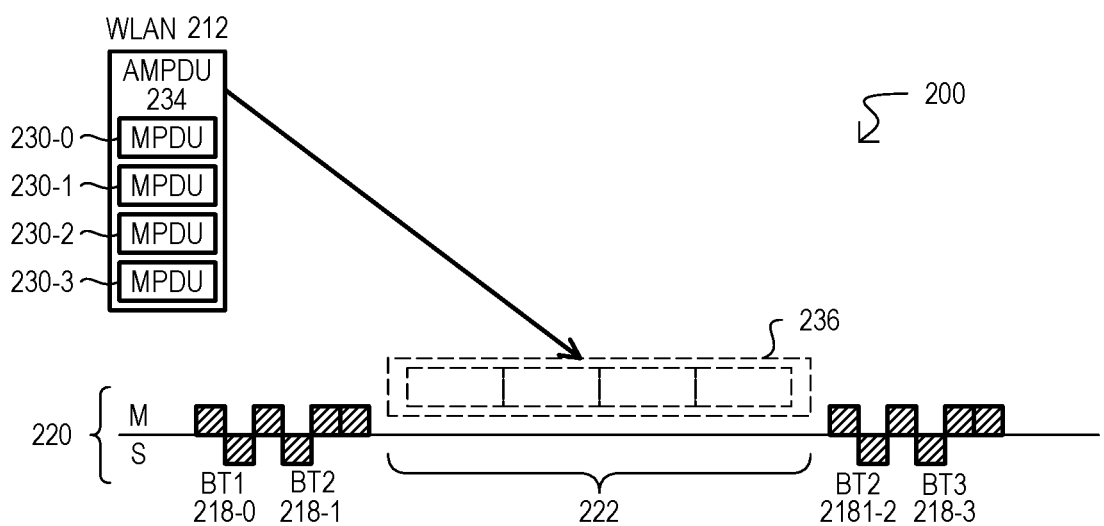

FIGS. 2A and 2B are diagrams showing the operation of a system 200 according to another embodiment. A system 200 can include a combination device with BT circuits (not shown) collocated on a same IC device as WLAN circuits 212. The BT circuits can be configured as a BT slave with respect to a BT master.

FIG. 2A shows a conventional BT SAM 216. Groups of used BT slots 218-0 to 218-3) can include transmissions by a BT master (M) and the BT circuits (S) of the combination device. Used BT slots (218-0 to -3) can be scheduled according to a default schedule or an initial schedule received from a BT master. WLAN circuits 212 can have a number of MAC protocol data units (MPDUs) 230-0 to -3 scheduled for transmission. As shown, assuming BT circuits are granted access to the medium as requested per conventional SAM 216, WLAN circuits 212 can have WLAN transmit opportunities (TXOPs) 232-0/1 to send MPDUs.

FIG. 2B shows how a modified SAM 220 can improve WLAN performance, particularly link capacity. As shown, a modified SAM 220 can schedule used BT slots (218-0 to -3) to create a time period 222 in which there is no scheduled BT activity by collocated BT circuits. However, other devices, including the BT master can consider time period 222 as including unavailable BT slots.

WLAN circuits 212 can schedule transmission of MPDUs (230-0 to -3) within time period 222. In some embodiments, this can include WLAN circuits 212 receiving information related to modified SAM 220 that indicates when time period 222 will start. In the embodiment shown, WLAN circuits 212 can combine MPDUs (230-0 to -3) into an Aggregate MPDU (AMPDU) 234 and transmit the AMPDU 234 in the time period 222 (shown as 236). However, in alternate embodiments, WLAN circuits 212 could transmit MPDUs (230-0 to -3) in a serial fashion within time period 222 or use some other aggregation protocol.

Figure 3A:
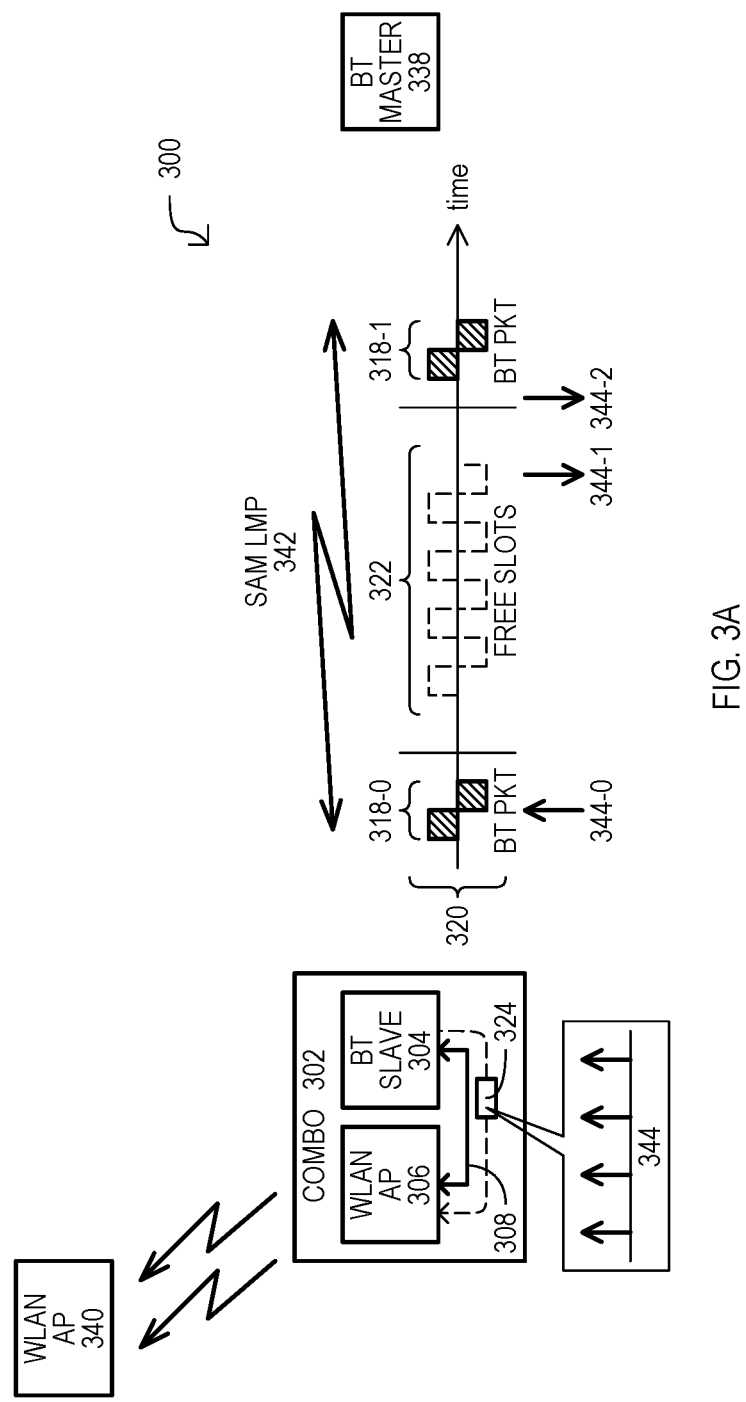
FIG. 3A is a block diagram of a system for controlling WLAN operations according to BT SAM information according to an embodiment.

FIG. 3A is a block diagram of a system 300 according to another embodiment. A system 300 can include a combination device 302, a second BT node 338, and a peer WLAN device 340. A combination device 302 can include a BT section 304 and WLAN section 306 connected by a communication path 308 over which scheduling information 324 can be transmitted. A BT section 304 can include circuits for executing wireless communication functions compatible with a BT standard, and can take the form of any of the those described herein, or equivalents. Similarly, a WLAN section 306 can include circuits for executing wireless communication functions compatible with a WLAN standard and can take the form of any of the those described herein, or equivalents.

A BT section 304 can serve as a first BT node and can be in communication with second BT node 338. BT section 304 and second BT node 338 can form all or part of a BT piconet. In the embodiment shown, BT section 304 can be configured as a BT slave while second BT node 338 can be configured as a BT master. According to embodiments, a BT section 304 and second BT node 338 can communicate with one another with a Link Manager Protocol (LMP) sequence 342 to arrive at a modified SAM 320 that concentrates BT packet transmission (e.g., 318-0/1) into contiguous or near groups of slots to maximize sequential free slots (e.g., 322). Such a sequence can include any of those described herein to produce a modified transmission schedule (e.g., SAM). However, in some embodiments, BT section 304 can generate a modified SAM and transmit it for acceptance by second BT node 338. If the modified SAM is not accepted, it can be changed (e.g., BT packet transmissions 318-0/1 moved, free slots 322 moved or reduced, etc.) and resent to the second BT node 338. According to embodiments, a BT section 304 and second BT node 338 can communicate with one another with a Link Manager Protocol (LMP) sequence 342 to arrive at a modified SAM 320.

Based on modified SAM 320, BT section 304 can generate pre-triggers 344 which can be sent to WLAN section 306 over communication path 308. Pre-triggers can precede any of various signaling events in a modified SAM 320. FIG. 3A shows three possible pre-triggers, but alternate embodiments can include any other suitable pre-triggers. A first type pre-trigger 344-0 can precede the start of a run of sequential free slots (e.g., 322). A second type pre-trigger 344-1 can precede the end of a run of sequential free slots (e.g., 322). A third type pre-trigger 344-2 can precede the start of scheduled BT activity (e.g., 318-1), in particular, the first BT activity following free slots 322.

A WLAN section 306 can serve as a first WLAN device in a basic service set (BSS) and can be in communication with peer WLAN device 340. In the embodiment shown, WLAN section 306 can be WLAN station (STA) while peer WLAN device 340 can be an access point (AP).

In response to triggers 344, WLAN section 306 can alter WLAN data transfer operations. In this way, SAM information from a collocated BT device can be used by WLAN circuits to alter WLAN scheduling. While changes in WLAN transmission/reception can take any suitable form, in some embodiments, a WLAN section 306 can hold transmissions until first type pre-trigger (e.g., 344-0) is received. Then, a set time period after the pre-trigger, the WLAN section 306 can execute WLAN transmissions (e.g., concentrate WLAN transmissions in the free slot time period 322). In addition or alternatively, in response to a first type pre-trigger, a WLAN section 306 can send a transmission to its BSS indicating it is ready to receive data. Such a transmission can take any suitable form, including a poll, but in some embodiments can be a WLAN trigger. For example, in response to a first-type pre-trigger (e.g., 344-0), a WLAN section 306 can issue a WLAN trigger transmission for peer WLAN device 340. In response to the WLAN trigger, peer WLAN device 340 can transmit data for reception by WLAN section 306. A WLAN trigger can be a trigger addressed to a device or can be a broadcast transmission.

A WLAN section 306 can also respond to a second or third type pre-trigger (e.g., 344-1/2). As but one example, in response to a second or third type pre-trigger, a WLANs section 306 can cease WLAN transmissions a predetermined time after receiving the second type pre-trigger. In addition, a WLAN section 306 can cease or reduce WLAN operations for a predetermined period of time (e.g., frame) to prevent interference with BT transmissions.

Figure 3B:
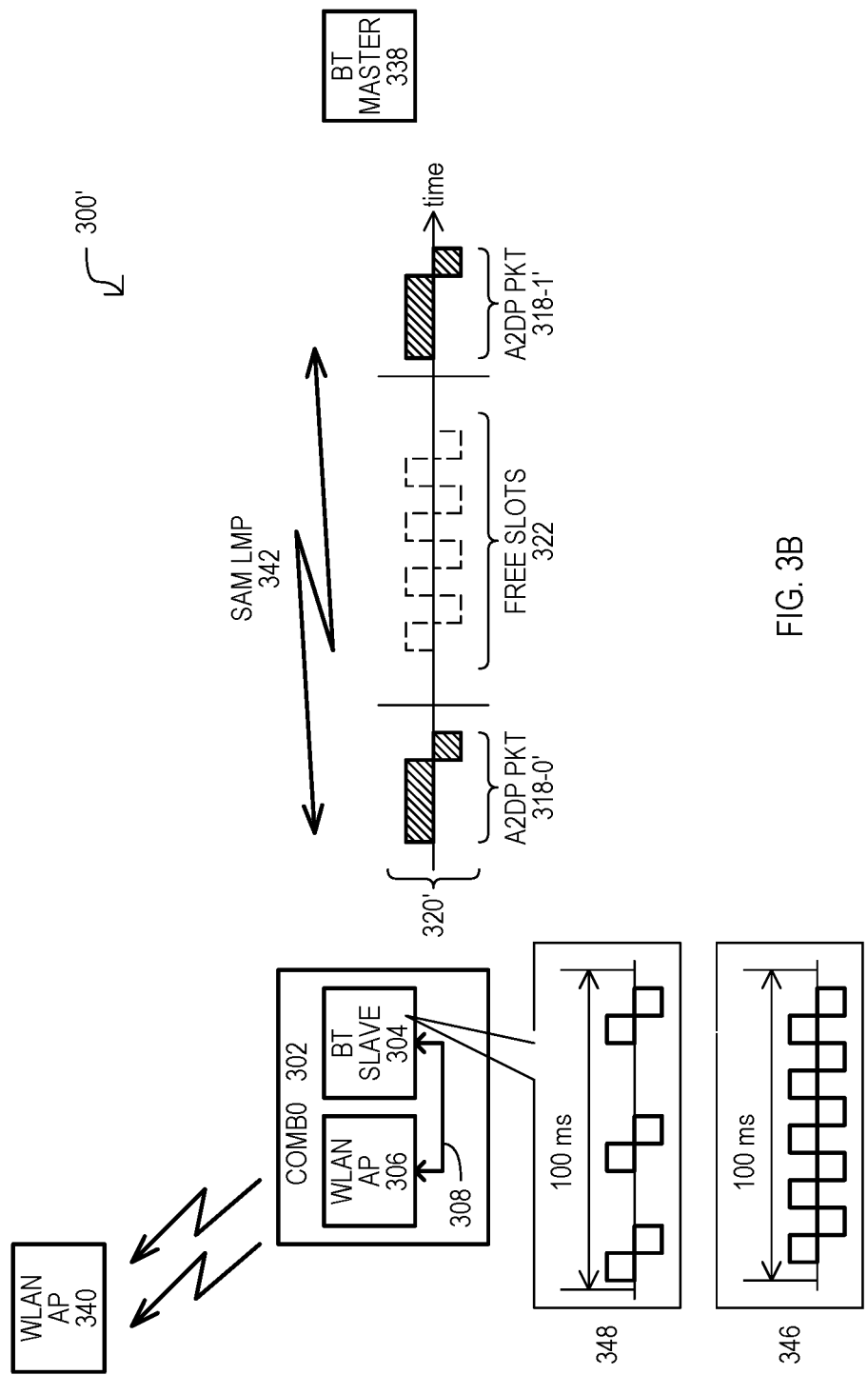
FIG. 3B is a block diagram of a system for minimizing a BT data receive duty cycle using a SAM according to an embodiment.

FIG. 3B is a block diagram of another system 300' according to an embodiment. A system 300' can include items like those of FIG. 3A, including a combination device 302, a second BT node 338, and a peer WLAN device 340.

As in the case of FIG. 3A, in FIG. 3B BT section 304 can serve as a slave BT node and in communication with a second (master) BT node 338. However, unlike FIG. 3A, BT section 304 is configured to a receive streaming data from second BT node 338. In the embodiment shown, BT section 304 can be configured as an Advanced Audio Distribution Profile (A2DP) audio sink, and receive BT A2DP packets at a predetermined rate, and process such packets with a predetermined latency (e.g., 100-150 ms). According to embodiments, BT section 304 can create or negotiate a SAM that schedules data reception slots at a lowest predetermined duty cycle, while at the same time maximizing sequential free slots. A lowest predetermined duty cycle can be the minimum amount of data slots for meeting a latency requirement, optionally with some margin. A lowest predetermined duty cycle can include not only slots for streamed data, but other slots needed to meet other piconet data transfer operations.

FIG. 3B shows a modified SAM 320' that includes BT A2DP packets (e.g., 318-0'/1') spaced in time to create sequential free slots 322. BT A2DP packets (e.g., 318-0'/1') can be scheduled with a low duty cycle by at a rate sufficient to meet a latency requirement.

Referring still to FIG. 3B, according to embodiments, a modified SAM 320' can reduce a BT transmission (TX) duty cycle as compared to conventional approaches. In a conventional approach, BT section 304 can request control over the medium from WLAN section 306, as needed, to create a window in which streamed data packets (e.g., A2DP packets) can be received. If the medium is free, a WLAN section 306 can yield the medium to the BT section 304 for a BT RX window. When the BT RX window is over, the WLAN section 306 regains control of the medium. Thus, to receive a next set of streamed data packets, BT section 304 will have to once again request access to the medium. In some cases, a WLAN section 306 may not yield the medium, forcing BT section 304 to repeat a medium request for its A2DP data. This process can repeat as data is streamed, with the BT section 304 periodically requesting the medium. Such a conventional approach is represented in FIG. 3B by 346. Over a time period (e.g., 100 ms), BT section 304 can make continuous requests to meet a streaming requirement.

In contrast, according to embodiments a BT section 304 can arrive at a SAM with slots dedicated to the reception of streaming data. As but one example, BT section 304 can receive or generate (and adjust if necessary) a SAM (e.g., 320') having slots dedicated to receiving streaming audio data (e.g., mark them as available in a SAM accepted by second BT node 338). Dedicated slots can be sufficient to meet a latency requirement (can have some additional margin, in some embodiments). Such an approach is represented in FIG. 3B by 348. Over a time period (e.g., 100 ms), BT section 304 can make only periodic requests. This can result in a significant reduction in a BT RX duty cycle. For example, in a given time period (e.g., 100 ms) a conventional approach can include about twenty requests to control a medium along with BT data transfer operations. In contrast, with a SAM according to embodiments, such accesses can be reduced to about two. Such a significant reduction in requests for media access, and more efficient transfers of streaming data can result in significant power savings in a BT section, as compared to conventional approaches which do not appropriate BT slots for streamed data with a SAM. Such approaches can also increase WLAN channel capacity as noted for FIG. 3A.

Figure 4:
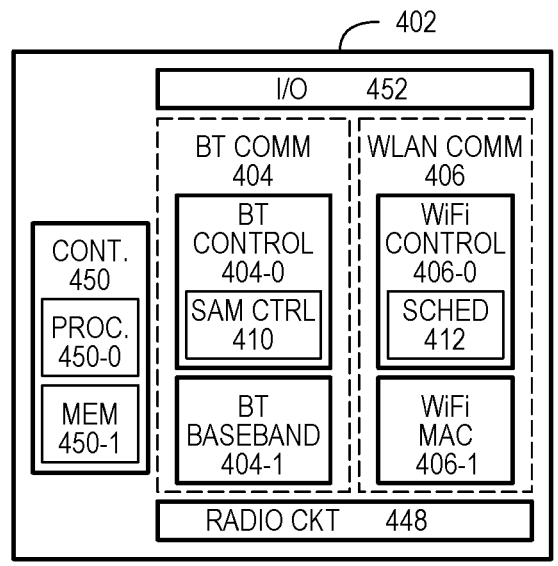
FIG. 4 is a block diagram of a combination device according to an embodiment.

FIG. 4 is a block diagram of a combination device 402 according to another embodiment. In some embodiments, combination device 402 can be one particular implementation of combination devices shown in FIGS. 1A to 3B. A combination device 402 can include first communication circuits 404, second communication circuits 406, controller circuits 450, radio circuits 448, and input/output (I/O) circuits 452. First communication circuits 404 can be BT circuits, including BT control circuits 404-0 and BT baseband circuits 404-1. BT circuits 404 can operate in a 2.4 GHz band according to one or more BT standards. BT control circuits 404-0 can control BT operations, including the formation and transmission of BT packets. BT control circuits 404-0 can include SAM control circuits 410, which can generate, adjust, and negotiate to arrive at a modified SAM, as described herein and equivalents.

Second communication circuits 406 can be WLAN circuits, including Wi-Fi control circuit 406-0 and Wi-Fi media access control (MAC) circuits 406-1. WLAN circuits can operate in 2.4 GHz WLAN bands as well as 5.0 GHz WLAN bands. Wi-Fi control circuits 406-0 can include a WLAN scheduling circuit 412. WLAN scheduling circuit 412 can alter WLAN transmissions in response to SAM information received from BT circuits 404 as described herein and equivalents.

Controller circuits 450 can control operations of a combination device 402, including processing control inputs to access functions of BT circuits 404 and WLAN circuits 406. In the embodiment shown, controller circuits 450 can include one or more processors 450-0 and a memory system 450-1.

Radio circuits 448 can include any suitable radio circuits for enabling wireless data transmission and reception compatible with first communication circuits 404 and second communication circuits 406. In some embodiments, radio circuits 448 can include physical layer (PHY) circuits and baseband circuits. In some embodiments, radio circuits 448 can transmit/receive on any internationally recognized ISM band. As but one example, radio circuits 448 can transmit and receive at a bands around 2.4 GHz.

I/O circuits 452 can enable control of combination device 402 by another source external to the combination device 402. I/O circuits 452 can include circuits that enable communication with the combination device according to any suitable method, including any of various serial data communication standards/methods including but not limited to: serial digital interface (SDI), universal serial bus (USB), universal asynchronous receiver transmitter (UART), I²C, or I²S.

Figure 5:
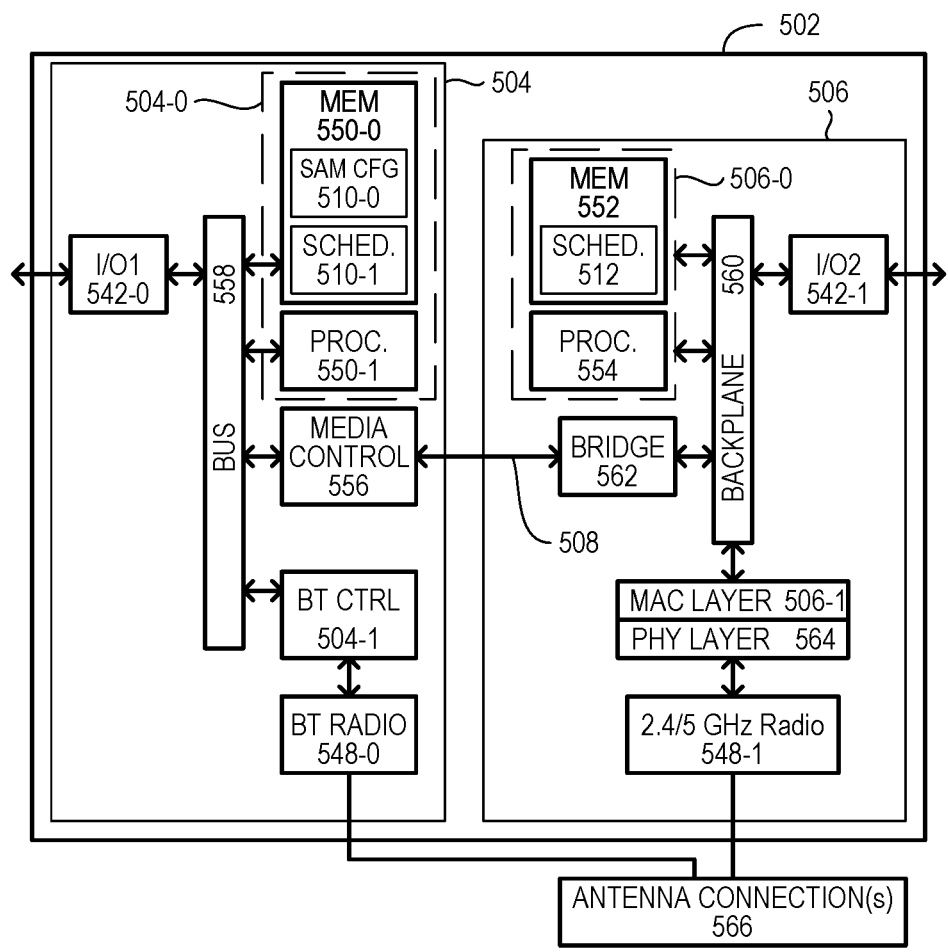
FIG. 5 is a block diagram of a combination BT WLAN device according to an embodiment.

FIG. 5 is a block diagram of a combination device 502 according to another embodiment. In some embodiments, combination device 502 can be one particular implementation of those shown in FIGS. 1A to 4. A combination device 502 can include a BT section 504 and a WLAN section 506. A BT section 504 can include a controller 504-0, BT control circuits 504-1, media control circuit 556, and first I/O circuits 542-0 in communication with one another over a bus 558. A controller 504-0 can communicate with WLAN section 506 via bus 558 and bridge 508 with media control circuits 556, or any other suitable manner. A controller 504-0 can include one or more processors 550-1 and a memory system 550-0. A controller 504-0 and store, create or modify SAMs as described herein and equivalents. In the embodiment shown, memory system 550-0 can store configuration data for one or more SAMs 510-0. Further, memory system 550-0 can include instructions executable processor(s) 550-1 to create or modify a SAM to concentrate BT transmissions, and create consecutive slots for potential WLAN activity, as described herein and equivalents.

BT control circuits 504-1 can include circuits for performing functions according to one or more BT standards. In some embodiments, this can include executing LMP sequences to send SAMs to other BT nodes and receive SAMs from other BT nodes.

Media control circuits 556 can communicate with WLAN section 506 over bridge 508 to coordinate communications between BT and WLAN sections (504, 506). In some embodiments this can include WLAN section 506 receiving requests from BT circuits 504 to yield the medium to the BT circuits 504. In addition or alternatively, this can include BT section 504 sending SAM information (including pre-triggers) to WLAN section 506. First I/O circuits 542-0 can enable communication with the combination device 502 according to any of the embodiments described herein or equivalents.

BT radio circuits 548-0 can convert BT packet data into suitable radio signals for transmission, as well as receive BT packets for demodulation.

A WLAN section 506 can include WLAN control circuits 506-0, bridge control circuit 562, MAC layer circuits 506-1, and second I/O circuits 542-1 in communication with one another over a backplane 560. WLAN control circuits 506-0 can include a memory system 552 and one or more processors 554. WLAN control circuits 506-0 can control operations of WLAN section 506, including altering WLAN transmission in response to SAM information received from BT section 504 as described for herein and equivalents. For example, WLAN transmission scheduling can be altered according processor(s) 554 executing scheduling instructions 512 stored in memory system 552 based on received SAM information.

Bridge control circuit 562 can control data transfer operations between BT section 504 and WLAN section 506 over bridge 508, including the reception of SAM info from BT section 504. Second I/O circuits 542-1 can enable communication with the combination device 502 according to any of the embodiments described herein or equivalents, including communications with BT section 504 over bridge 508.

MAC layer circuits 506-1 can perform MAC layer operations, including the incorporation of suitable headers, error correction and length fields, as well as fragmentation and reassembly of data frames. MAC layer circuits 506-1 can receive data from and send data to WLAN control circuits 506-0 over a backplane 560.

PHY layer circuits 564 can be connected to MAC layer circuits 506-1 and can perform PHY layer operations, including but not limited to converting MAC layer data into a format suitable for the wireless medium being used, as well as controlling the modulation of outgoing data frames and the demodulation of incoming data frames.

WLAN radio circuits 548-1 can convert data frames into suitable radio signals for transmission, as well as receive radio signals for demodulation into data frames.

BT and WLAN radio circuits 548-0/1 can be connected to an antenna system via antenna connections 566.

FIGS. 6A and 6B are diagrams of SAMs according to embodiments. However, it is understood the SAMs are provided by way of example and should not be construed as limiting. FIG. 6A shows a SAM 620 having BT available slots 618-0 and 618-1 in which BT data can be received or transmitted. Available slots 618-0/1 are concentrated at two locations within SAM 620, however alternate embodiments can include a different distribution depending upon the application or profile. The concentration of available slots 618-0 can result in consecutive slots 622 which can be indicated as not available. Consecutive slots 622 can be interpreted by other BT devices of a piconet to be unavailable for transmission. However, within a combination device according to embodiments, consecutive slots 622 can be designated as TX and/or RX opportunities for a collocated WLAN circuit. FIG. 6A shows other unavailable slots 668. Such slots may be unavailable for purposes of the piconet, and so are understood not to be part of a WLAN TX/RX opportunity.

FIG. 6B shows a SAM 620' represented by submaps. Submaps are portions of a SAM that include like numbers of slots. As shown, two submaps 618-0'/1' are of type "1" indicating that all slots are available for BT transmission or reception. Such submaps 618-0'/1' can be used to consolidate scheduled BT transmissions resulting in unused submaps 622'. Like the consecutive slots 622 of FIG. 6A, submaps 622' of FIG. 6B can marked as unavailable (type 2) for other BT devices of a piconet but understood by a combination device to be TX and/or RX opportunities for a collocated WLAN circuit.

While embodiments can include any of the method described above with reference to devices and systems, additional methods will now be described with reference to flow diagrams.

Figure 7:
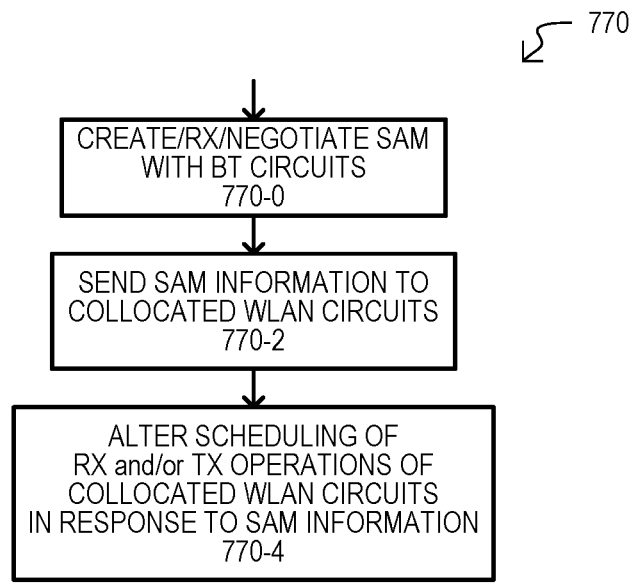
FIG. 7 is a flow diagram of a method of controlling a combination device according to an embodiment.

FIG. 7 is a flow diagram of method 770 for controlling transmission operations of a combination device according to an embodiment. A method 770 can be performed by a combination device as disclosed herein.

A method 770 can include receiving and/or negotiating a SAM with BT circuits 770-0. Such an action can include BT circuits generating a SAM, receiving a SAM, or negotiating a SAM with another device as described herein and equivalents. A SAM can have BT transmission operations concentrated in order to maximize consecutive slots that are not used by BT transmissions. SAM information can then be sent to collocated WLAN circuits 770-2. SAM information can take the form of any of those described herein, including but not limited to a data structure representing an entire SAM or timing signals (e.g., trigger, pre-triggers) to signal WLAN TX and/or RX opportunity times.

WLAN circuits can alter a scheduling of RX and/or TX operations in response to the SAM information 770-4. Such actions can include WLAN circuits concentrating (e.g., aggregating) data for transmission in the TX/RX opportunity time. In addition or alternatively, such actions can include WLAN circuit notifying other WLAN devices of the TX/RX opportunity time. However, various other WLAN alterations can occur in response to SAM information, and these particular examples should not be construed as limiting.

Figure 8:
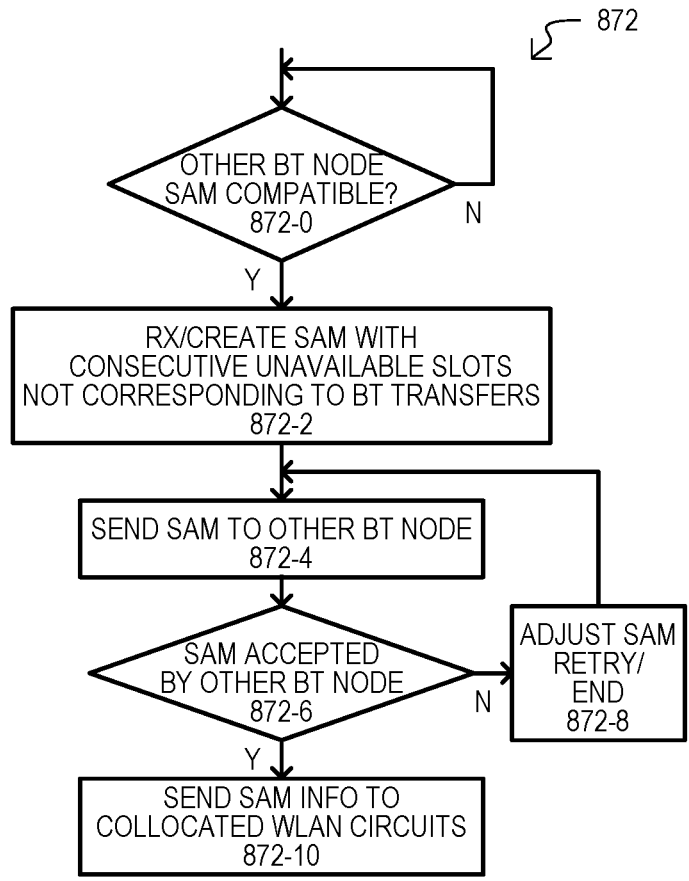
FIG. 8 is a flow diagram of a method for establishing a SAM in a system having collocated WLAN circuits, according to an embodiment.

FIG. 8 is a flow diagram of method 872 for establishing a SAM according to an embodiment. A method 872 can be executed by a BT node, including a BT section of a combination device.

A method 872 can include determining if another connected BT node can operate according to a SAM 872-0. If another node is not SAM compatible (N from 872-0), a method 872 will not create a SAM and will check once again if connected to another BT node.

If another node is SAM compatible (Y from 872-0), a method 872 can include receiving or creating a SAM with consecutive unavailable slots that do not correspond to BT data transfers 872-2. In some embodiments, such an action can include determining BT operations that are to occur in a SAM time frame and moving/consolidating them to create one or more runs of consecutive slots not having any scheduled BT operations.

The SAM can be sent to the other BT node 872-4. Such an action can include a LMP sequence, as but one example. If the SAM is not accepted by the other BT node (N from 872-6), a method 872 can adjust the SAM 872-8. This can include increasing and/or moving BT transmission slots. More particularly, a request can be received to adjust the SAM from the other BT node, and the requested adjustment can be accepted if the resulting SAM still includes an acceptable number of consecutive unavailable slots. A method 872 can continue to attempt adjustments to a SAM and request acceptance at the other BT node until performance levels can no longer be met, after which attempts to use the SAM can end.

If the SAM is accepted by the other BT node (Y from 872-6), a method 872 can send information for the SAM to collocated WLAN circuits 872-10. Such actions can include any of those described herein or equivalents.

Figure 9:
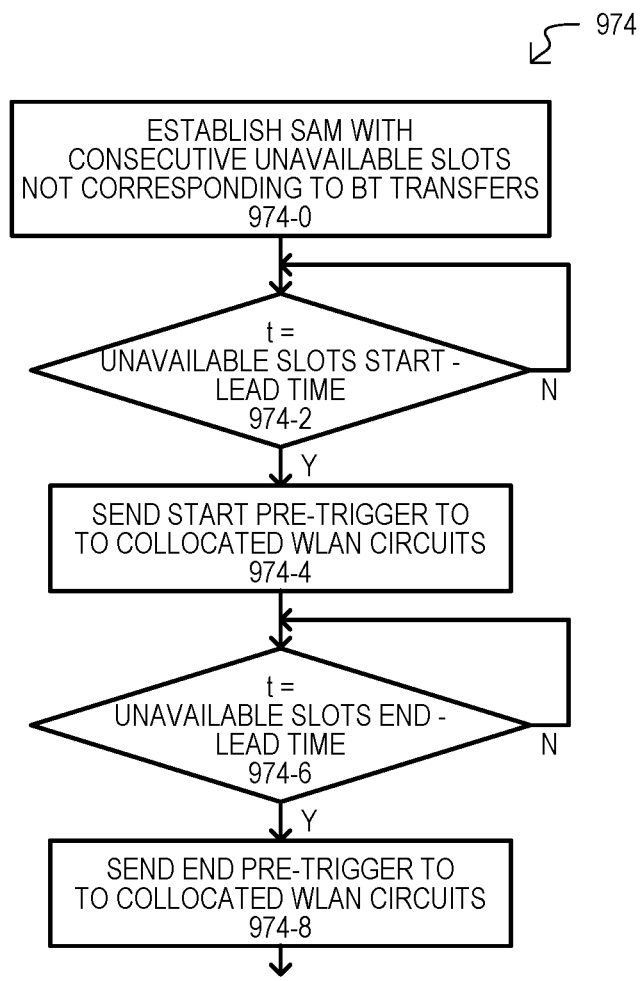
FIG. 9 is a flow diagram of a method for generating pre-triggers for WLAN circuits from a SAM according to an embodiment.

FIG. 9 is a flow diagram of method 974 for sending SAM based pre-trigger signals from BT circuits to collocated WLAN circuits according to an embodiment. A method 974 can be executed by a BT section of a combination device.

A method 974 can include establishing a SAM with consecutive unavailable slots that do not correspond to BT data transfers 974-0. Such an action can include any of those described herein or equivalents, including generating the SAM, receiving the SAM from another BT node, or negotiating the SAM with another BT node.

A method 974 can then wait until a time (t) reaches a start pre-trigger point 974-2. A start pre-trigger point can be the start of the unavailable slots less some lead time. The lead time can be some predetermined time, or can be event based (e.g., last scheduled BT data transfer before the start time). When a start pre-trigger point is reached (Y from 974-2), a method 974 can send a start pre-trigger to collocated WLAN circuits 974-4.

A method 974 can then wait until the time reaches an end pre-trigger point 974-6. An end pre-trigger point can be at the end of the unavailable slots less some lead time. In alternate embodiments, an end pre-trigger point can be event based and occur after the unavailable slots (e.g., first request for the medium by a BT section after the unavailable slots). When an end pre-trigger point is reached (Y from 974-6), a method 974 can send an end pre-trigger to collocated WLAN circuits 974-8.

Figure 10:
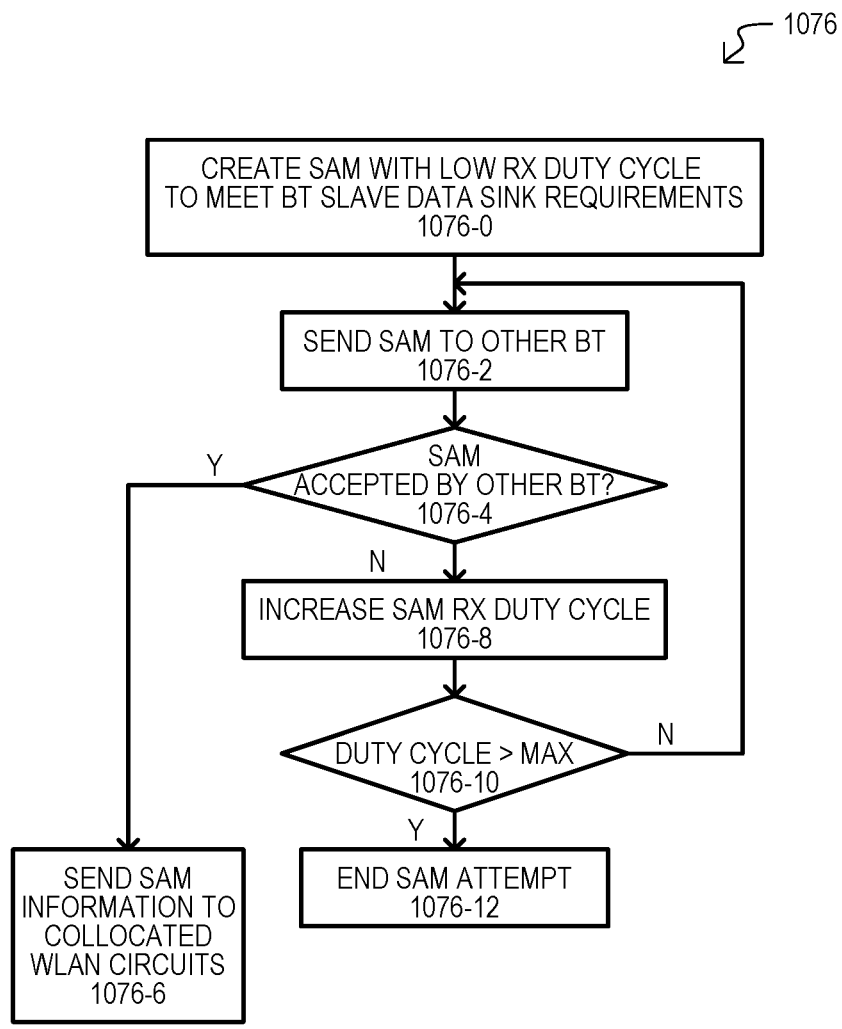
FIG. 10 is a flow diagram of a method for generating a SAM having a low receive duty cycle when serving as a data sink according to an embodiment.

FIG. 10 is a flow diagram of method 1076 for establishing a low BT RX duty cycle SAM for a system according to an embodiment. A method 1076 can be executed by a BT node, including a BT section of a combination device.

A method 1076 can include creating a SAM with a low RX duty cycle that meets a slave BT data sink requirements 1076-0. Such an action can include creating a SAM with data RX slots that occur at a lower data cycle than conventional scheduling. In some embodiments, such an action can include creating a SAM with as low an RX frequency as possible to meet a data transfer requirement (e.g., streaming, latency), plus some margin (e.g., a limited number of additional slots marked as available). A resulting SAM can be sent to another BT node 1076-2. If the SAM is accepted by the other BT (Y from 1076-4), a method can send information based on the SAM to collocated WLAN circuits 1076-6.

If the SAM is not accepted by the other BT (N from 1076-4), a method can increase the RX duty cycle of the SAM 1076-8. If the duty cycle remains below some maximum (N from 1076-10) a method can resend the SAM to the other BT (return to 1076-2). A maximum duty cycle can be a predetermined value or can be that equivalent to conventional scheduling, as but two of many possible examples. If the duty cycle exceeds the maximum (Y from 1076-10) a method 1076 can cease trying to set up a low duty cycle SAM 1076-12.

Figure 11:
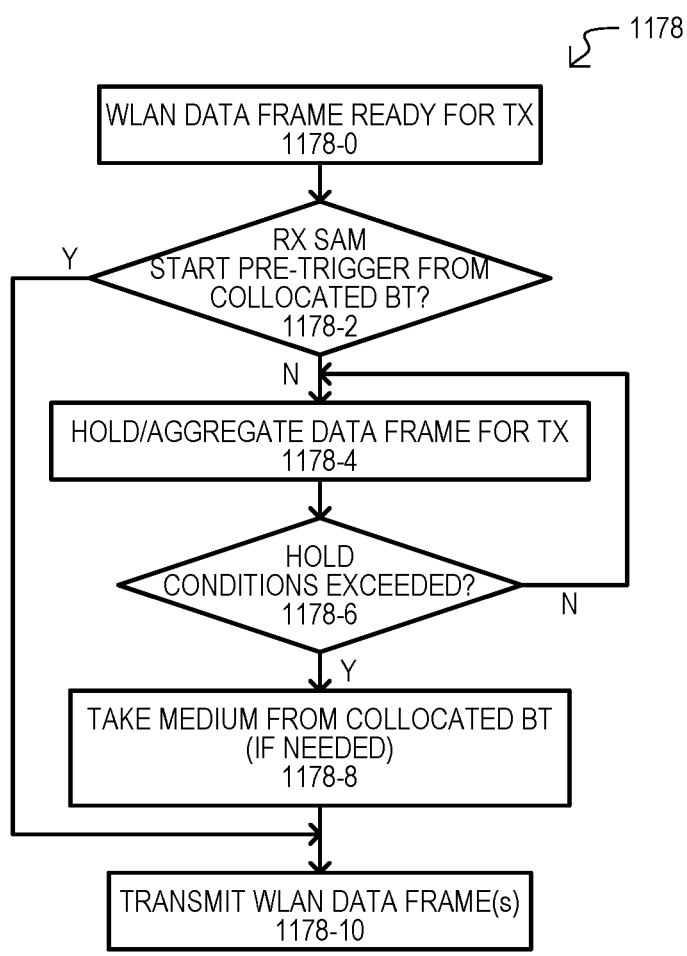
FIG. 11 is a flow diagram of a method for transmitting WLAN data in response to SAM information from collocated BT circuits according to an embodiment.

FIG. 11 is a flow diagram of method 1178 for aggregating WLAN transmissions in a window established by a SAM of collocated BT circuits according to an embodiment. A method 1178 can be executed by a WLAN section of a combination device.

A method 1178 can include one or more WLAN data frames being ready for transmission (1178-0). A method 1178 can determine if it receives a start pre-trigger generated from SAM information of the collocated BT circuits 1178-2.

If the pre-trigger is received (Y from 1178-2), the held or aggregated data frames can be transmitted 1178-10. Such an action can include transmitting the data frames in a serial fashion or transmitting the data frames in an aggregated form (e.g., AMPDU), as but two examples.

If the trigger is not received (N from 1178-2), WLAN circuits can hold and/or aggregate the data frames 1178-4. A method 1178 can then determine if hold conditions have been exceeded 1178-6. Such an action can include exceeding some delay limit for the data frames. If hold conditions are not exceeded (N from 1178-6) a method 1178 can continue to hold and/or aggregate data frames (return to 1178-4). If hold conditions are exceeded (Y from 1178-6) a method 1178 can include the WLAN section taking control of the medium 1178-8 and then transmitting the data frames 1178-10.

Figure 12:
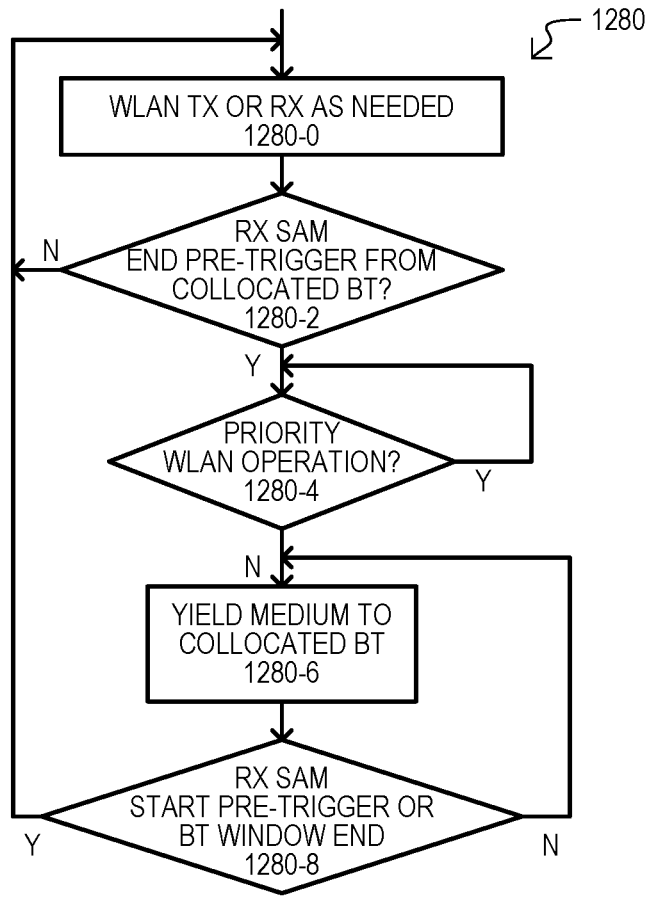
FIG. 12 is a flow diagram of a method of altering WLAN operations in response to SAM information from collocated BT circuits according to an embodiment.

FIG. 12 is a flow diagram of method 1280 for controlling WLAN operations according to SAM based information from a collocated BT section according to an embodiment. A method 1280 can be executed by a WLAN section of a combination device.

A method 1280 can include executing WLAN operations (TX and RX) as needed 1280-0. Such an action can include a WLAN section controlling the medium shared with a BT section. While a SAM end pre-trigger is not received from a collocated BT section (N from 1280-2), WLAN operations can continue 1280-0.

However, if a SAM end pre-trigger is received from a collocated BT section (Y from 1280-2), a method can determine if it is executing a priority WLAN operation 1280-4. If a priority WLAN operation is in progress (Y from 1280-4), a method 1280 continue such an operation until it is completed or abandoned.

If a priority WLAN operation is not in progress (N from 1280-4), the WLAN section can yield the medium to the collocated BT section 1280-6. As long as a SAM start pre-trigger is not received or a BT operation window remains open (N from 1280-8), the medium can continue to be controlled by the BT section. When a SAM start pre-trigger is received or a BT operation window ends (Y from 1280-8), WLAN operations can resume (e.g., a WLAN section can retake control of the medium) (return to 1280-0).

Figure 13:
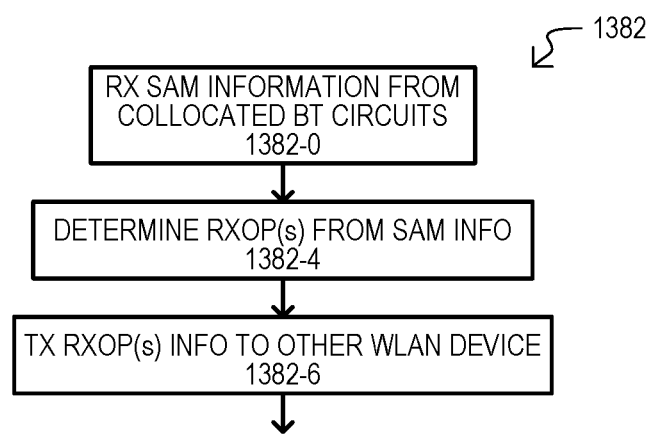
FIG. 13 is a flow diagram of a method for establishing a WLAN data receive window in response to SAM information from collocated BT circuits according to an embodiment.

FIG. 13 is a flow diagram of method 1382 for signaling a WLAN receive opportunity (RXOP) according to SAM based information according to an embodiment. A method 1382 can be executed by a WLAN section of a combination device.

A method 1382 can include receiving SAM information from collocated BT circuits 1382-0. Such an action can include any of those described herein or equivalents (e.g., actual data representation of the SAM or a pre-trigger timed according to the SAM). A WLAN section can determine a RXOP from the SAM info 1382-4. In some embodiments this can include determining a start of the RXOP. However, in other embodiments this can also include determining a duration of the RXOP.

Once a the RXOP has been determined, a method 1382 can include the WLAN section transmitting information for the TXOP 1382-6. Such an action can include any suitable notification, but in particular embodiments can include a WLAN trigger of poll transmission intended to elicit a data transfer from another WLAN device. Other WLAN devices can receive such a transmission and schedule the transmission of data to the WLAN section in the indicated RXOP.

Figure 14:
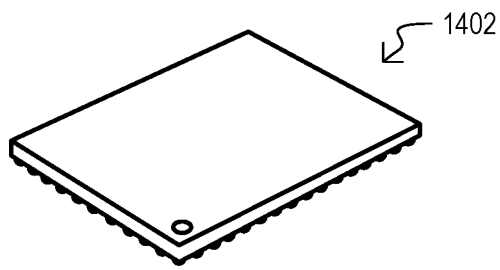
FIG. 14 is a diagram of a combination device according to another embodiment.

While embodiments can take any suitable form, some embodiments can be unitary devices of advantageously compact size. For example, in some embodiments a combination device can be a single integrated circuit. FIG. 14 show one particular example of a packaged single chip combination device 1402. Such a device can include collocated wireless communication circuits, as described herein, including WLAN circuits which can alter operation based on SAM information received from collocated BT circuits.

However, it is understood that a combination device according to embodiments can include any other suitable integrated circuit packaging type, as well as direct bonding of a combination device chip onto a circuit board or other substrate.

Figure 15A:
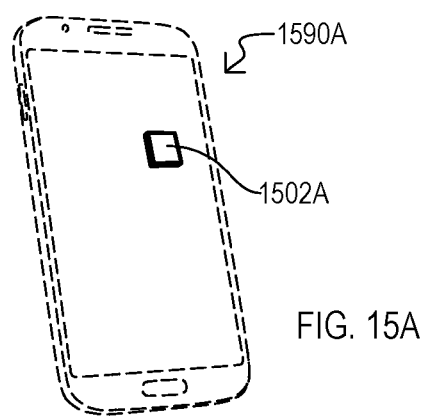
FIGS. 15A to 15D are diagrams of systems according to various embodiments.

Referring to FIGS. 15A to 15D, various systems according to embodiments are shown in series of diagrams. FIG. 15A shows a handheld computing device 1590A. Handheld computing device 1590A can include a combination device 1502A that can control transmissions as described herein, or equivalents.

Figure 15B:
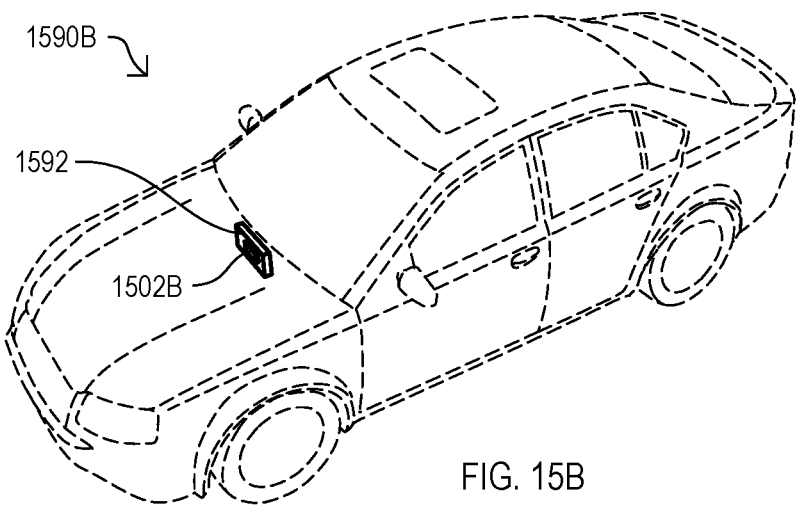

FIG. 15B shows an automobile 1590B that can have numerous sub-systems, including a communication subsystem 1592. In some embodiments, a communication subsystem 1592 can enable an automobile to provide Wi-Fi communications as well as enable other devices to pair to the system via Bluetooth. Communication subsystem 1592 can include a combination device 1502B as described herein, or equivalents.

Figure 15C:
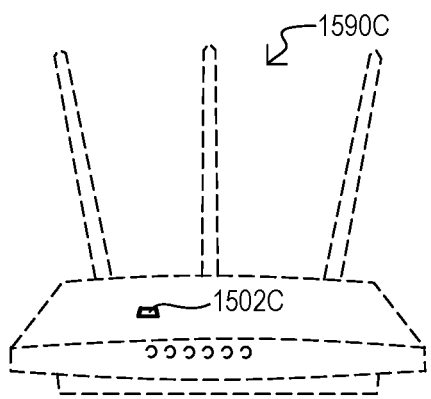

FIG. 15C shows a router device 1590C. Router device 1590C can provide routing functions for a relatively large range protocol (e.g., WLAN) while also enabling access via a closer range protocol (e.g., Bluetooth). Router device 1590C can include a combination device 1502C as described herein, or equivalents.

Figure 15D:
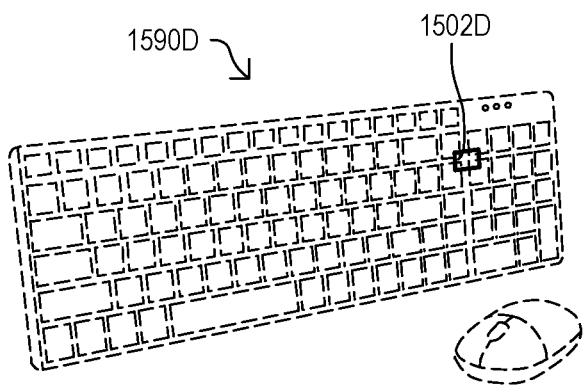

FIG. 15D shows a human interface device 1590D. Human interface device 1590D can enable a person to interact or control other devices. As but a few of many possible examples, human interface device 1590D can control a computing system, manufacturing equipment or other systems. Human interface device 1590D can include a combination device 1502D as described herein, or equivalents.

Embodiments described herein are in contrast to conventional systems in which a BT section can continually request access to a medium shared with a collocated WLAN section. According to embodiments, a BT SAM can be established that consolidates BT transmissions to thereby create contiguous unused BT slots in the SAM, which can be used as WLAN transmit or receive opportunities. This can reduce power consumption by the BT section as well as increase performance of the WLAN section.

These and other advantages would be understood by those skilled in the art.

It should be appreciated that reference throughout this specification to "one embodiment" or "an embodiment" means that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the invention.

Similarly, it should be appreciated that in the foregoing description of exemplary embodiments of the invention, various features of the invention are sometimes grouped together in a single embodiment, figure, or description thereof for the purpose of streamlining the disclosure aiding in the understanding of one or more of the various inventive aspects. This method of disclosure, however, is not to be interpreted as reflecting an intention that the claims require more features than are expressly recited in each claim. Rather, inventive aspects lie in less than all features of a single foregoing disclosed embodiment. Thus, the claims following the detailed description are hereby expressly incorporated into this detailed description, with each claim standing on its own as a separate embodiment of this invention.

What is claimed is:

1. A method, comprising:
   at a combination device configured as a streaming audio data sink according to a predetermined profile,
   receiving from a master device an initial slot availability mask (SAM) compatible with a Bluetooth and/or Bluetooth Low Energy (BT) standard, the initial SAM having an initial BT data reception duty cycle that meets a BT data latency requirement of the predetermined profile;
   by operation of BT compatible circuits of the combination device,
      in response to receiving the initial SAM, generating a modified SAM having a modified BT data reception duty cycle that is lower than the initial BT data reception duty cycle but still meets the BT data latency requirement of the predetermined profile, the generating of the modified SAM including communicating with the master device using a BT link manager protocol, the modified SAM including consecutive unused BT slots in which BT transmissions and BT reception is prohibited for the master device and the combination device, and
      generating BT protection signals in response to the modified SAM; and
   by operation of circuits compatible with at least one IEEE 802.11 wireless standard (WLAN circuits),
      in response to at least the modified SAM
      withholding WLAN compatible data transmissions until the consecutive unused BT slots, including establishing BT protection frames in response to the BT protection signals that limit or halt WLAN transmissions in the BT protection frames to reduce interference with BT transmissions, and
      sending WLAN transmissions indicating a time period within the consecutive unused BT slots as a data reception opportunity for WLAN data transfers to the WLAN circuits.

2. The method of claim 1, wherein:
   withholding WLAN compatible data transmissions includes aggregating WLAN data transfers for transmission in the consecutive unused BT slots.

3. The method of claim 2, wherein aggregating WLAN data transfers includes forming at least one aggregated MAC protocol data unit (AMPDU) from a plurality of MPDUs.

4. The method of claim 1, wherein:
   the predetermined profile is the Advanced Audio Distribution (A2DP) profile.

5. The method of claim 1, wherein:
   the BT protection signals comprise BT pre-trigger signals.

6. The method of claim 1, wherein:
   the combination device is an integrated circuit device that further includes
   BT radio circuits,
   WLAN radio circuits, and
   at least one serial input/output circuit configured to enable control of the combination device.

7. The method of claim 1, wherein:
   the BT compatible circuits include a first processor configured to generate the modified SAM, and
   the WLAN circuits include a second processor configured to control WLAN compatible data transfers.

8. A device configured as a streaming audio data sink according to a predetermined profile, comprising:
   Bluetooth and/or Bluetooth Low Energy (BT) compatible circuits formed in an integrated circuit package and configured to
      receive an initial slot availability mask (SAM) from a master device compatible with a BT standard, the initial SAM having an initial BT data reception duty cycle that meets a BT data latency requirement established by the predetermined profile,
      in response to receiving the initial SAM, generate a modified SAM having a modified BT data reception duty cycle that is lower than the initial BT data reception duty cycle but still meets the BT data latency requirement of the predetermined profile, the modified SAM including
      consecutive unused BT slots in which BT transmissions and BT reception is prohibited for the master device and the device, and
      generate BT protection signals in response to the modified SAM; and
   circuits compatible with at least one IEEE 802.11 wireless standard (WLAN circuits) formed in the same integrated circuit package and configured to
      receive the modified SAM via a data path to the BT compatible circuits, in response to at least the modified SAM, withhold WLAN compatible data transmissions until the consecutive unused BT slots, including establishing BT protection frames in response to the BT protection signals that limit or halt WLAN transmissions in the BT protection frames to reduce interference with BT transmissions; and send WLAN transmissions indicating the consecutive unused BT slots as a receive window for WLAN data transfers to the WLAN circuits; wherein the BT compatible circuits and WLAN circuits are configured to share at least a portion of the same transmission medium; and the modified SAM is generated with a BT link manager protocol sequence with the master device.

9. The device of claim 8, wherein:
the BT compatible circuits and WLAN circuits are formed on a same integrated circuit substrate.

10. The device of claim 8, wherein:
the WLAN circuits are further configured to
aggregate WLAN data transfers for transmission in the consecutive unused BT slots.

11. The device of claim 8, wherein:
the BT protection signals comprise BT pre-trigger signals.

12. The device of claim 8, wherein:
the predetermined profile is the Advanced Audio Distribution (A2DP) profile.

13. The device of claim 8, wherein:
the device is an integrated circuit device that further includes
BT radio circuits,
WLAN radio circuits, and
at least one serial input/output circuit configured to enable control of the device.

14. The device of claim 8, wherein:
the BT compatible circuits include a first processor configured to generate the modified SAM, and
the WLAN circuits include a second processor configured to control WLAN compatible data transfers.

15. A system, comprising:
a Bluetooth and/or Bluetooth Low Energy (BT) compatible master node; and
a combination device configured as a streaming audio data sink according to a predetermined profile that includes
BT compatible circuits in communication with at least the BT compatible master node and configured to
receive an initial slot availability mask (SAM) from the BT compatible master node having an initial BT data reception duty cycle,
the initial SAM meeting a BT data latency requirement of the predetermined profile,
in response to receiving the initial SAM, generate a modified SAM having a modified BT data reception duty cycle that is lower than the initial BT data reception duty cycle but still meets the BT data latency requirement, the modified SAM including
consecutive unused BT slots in which BT transmissions and BT reception is prohibited for the master node and the combination device, and
generate BT protection signals in response to the modified SAM; and
circuits compatible with at least one IEEE 802.11 wireless standard (WLAN circuits) and configured to determine a WLAN data transfer schedule in response to at least the modified SAM including
executing WLAN compatible data transfers in the consecutive unused BT slots,
send WLAN transmissions indicating the consecutive unused BT slots as a receive window for WLAN data transfers to the WLAN circuits,
establish BT protection frames in response to the BT protection signals, and
limit or halt WLAN transmission in the BT protection frames to reduce interference with BT transmissions; wherein
the modified SAM is generated with a BT link manager protocol sequence with the master node.

16. The system of claim 15, wherein:
the WLAN circuits are configured to aggregate WLAN data transfers for transmission in the consecutive unused BT slots.

17. The system of claim 15, wherein:
the BT protection signals comprise BT pre-trigger signals.

18. The system of claim 15, wherein:
the predetermined profile is the Advanced Audio Distribution (A2DP) profile.

19. The system of claim 15, wherein:
the combination device is an integrated circuit device that further includes
BT radio circuits,
WLAN radio circuits, and
at least one serial input/output circuit configured to enable control of the device.

20. The system of claim 15, wherein:
the BT compatible circuits include a first processor configured to generate the modified SAM, and
the WLAN circuits include a second processor configured to control WLAN compatible data transfers.

* * * * *